(12) United States Patent
Haist et al.

(10) Patent No.: US 12,360,036 B2
(45) Date of Patent: Jul. 15, 2025

(54) IMAGING DEVICE FOR IMAGING AT LEAST ONE OBJECT

(71) Applicant: Universität Stuttgart, Stuttgart (DE)

(72) Inventors: Tobias Haist, Stuttgart (DE); Robin Hahn, Stuttgart (DE); Kristina Michel, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 93 days.

(21) Appl. No.: 18/050,334

(22) Filed: Oct. 27, 2022

(65) Prior Publication Data

US 2023/0152218 A1 May 18, 2023

(30) Foreign Application Priority Data

Nov. 18, 2021 (EP) .................................. 21209086

(51) Int. Cl.
*G01N 21/31* (2006.01)
*G01J 3/18* (2006.01)
(Continued)

(52) U.S. Cl.
CPC ............... *G01N 21/31* (2013.01); *G01J 3/18* (2013.01); *G01J 3/2823* (2013.01);
(Continued)

(58) Field of Classification Search
CPC .......... G01N 21/31; G01J 3/18; G01J 3/2823; G01J 2003/2826; G02B 5/1866;
(Continued)

(56) References Cited

U.S. PATENT DOCUMENTS

| 6,856,466 | B2* | 2/2005 | Tocci | G02B 27/1013 |
| | | | | 359/740 |
| 7,289,209 | B2* | 10/2007 | Kowarz | G01J 3/32 |
| | | | | 356/330 |

(Continued)

OTHER PUBLICATIONS

Hagen et al., Review of Snapshot Spectral Imaging Technologies, Optical Engineering, vol. 52(9), 090901, 2013, 24 pages, Jan. 1, 2013.
(Continued)

*Primary Examiner* — Dominic J Bologna
(74) *Attorney, Agent, or Firm* — Woodard, Emhardt, Henry, Reeves & Wagner, LLP (57) ABSTRACT

An imaging device and method for imaging an object, such as for multispectral or hyperspectral imaging, are disclosed. The imaging device includes an image sensor located in an image plane of the imaging device. The image sensor includes photosensitive elements. A first imaging system is configured to generate an intermediate image of the object in an intermediate image plane. A second imaging system is configured to generate an image of the intermediate image on the image sensor in the image plane. A diffractive optical element is arranged in the intermediate image plane. An aperture is arranged in a beam path of the second imaging system between the intermediate image plane and the image sensor. The diffractive optical element, the second imaging system, and the aperture are arranged such that different images for different wavelengths of the intermediate image are generated on different groups of the photosensitive elements.

16 Claims, 5 Drawing Sheets

(51) Int. Cl.
  *G01J 3/28* (2006.01)
  *G02B 5/18* (2006.01)
  *G02B 13/22* (2006.01)
  *G02B 27/42* (2006.01)
  *H04N 23/45* (2023.01)

(52) U.S. Cl.
  CPC ........... *G02B 5/1866* (2013.01); *G02B 13/22* (2013.01); *G02B 27/4205* (2013.01); *G02B 27/4294* (2013.01); *H04N 23/45* (2023.01); *G01J 2003/2826* (2013.01)

(58) Field of Classification Search
  CPC ................ G02B 13/22; G02B 27/4205; G02B 27/4294; H04N 23/45

See application file for complete search history.

(56) References Cited

U.S. PATENT DOCUMENTS

| | | | |
|---|---|---|---|
| 2006/0209413 A1* | 9/2006 | Kim | G01J 3/26 359/577 |
| 2012/0049062 A1* | 3/2012 | Benner | G01N 23/041 250/311 |
| 2012/0147450 A1* | 6/2012 | Zhang | G02F 1/11 359/287 |
| 2015/0153156 A1* | 6/2015 | Shah | G01J 3/2823 356/456 |

OTHER PUBLICATIONS

Hahn et al., Detailed Characterization of a Mosaic Based Hyperspectral Snapshot Imager, Optical Engineering, vol. 59(12), 125102, 2020, 14 pages, Jan. 1, 2020.

Oktem et al., High-resolution Multi-spectral Imaging with Diffractive Lenses and Learned Reconstruction, arxiv.org, Cornell University Library, 201 Olin Library Cornell University Ithaca, NY, 14853, figure 1, 16 pages, Jun. 4, 2021.

* cited by examiner

IMAGING DEVICE FOR IMAGING AT LEAST ONE OBJECT

REFERENCE TO RELATED APPLICATIONS

This application claims the benefit of European Patent Application Number 21209086.4, filed Nov. 18, 2021, which is hereby incorporated by reference.

TECHNICAL FIELD

The present invention relates to an imaging device and a method for imaging at least one object. The imaging device and the method may be used for multispectral imaging or hyperspectral imaging of at least one object. Specifically, the imaging device and the method may be applied to perform spatially resolved measurements of optical spectra of a two-dimensional scene. The imaging device and the method may be used in a variety of applications, for example in the field of food quality control, evaluation of plants, irrigation control in agriculture, tissue sample analysis and/or monitoring of vital parameters in medicine, optical measuring systems, specifically in optical surface metrology, and/or astronomy. However, other fields of application involving multispectral and/or hyperspectral imaging of objects are also feasible.

BACKGROUND ART

In the field of multispectral imaging or hyperspectral imaging, a plurality of systems and devices for single-shot hyperspectral imaging are known. For example, Hagen, N. and Kudenov, M. W. provide in "Review of snapshot spectral imaging technologies", Optical Engineering, Vol. 52(9), 090901, 2013, a comprehensive survey of the available snapshot technologies and show how the capabilities of snapshot approaches can be fully utilized.

As another example, Hahn, R. et al., describe in "Detailed characterization of a mosaic based hyperspectral snapshot imager", Optical Engineering, Vol. 59(12), 125102, 2020, a detailed examination of a hyperspectral sensor including a description of the measurement setup. The evaluated sensor offers 25 channels based on Fabry-Pérot filters. The setup illuminates the sensor with discrete wavelengths under a specified angle of incidence. This allows characterization of the spatial and angular response of every channel of each macropixel of the tested sensor on the illumination. The results of the characterization form the basis for a spectral reconstruction of the signal, which is essential to obtain an accurate spectral image.

Despite the advantages achieved by known method and devices, several technical challenges remain. Specifically, known devices may comprise complex systems using non-standard components. These detectors, generally, are rather expensive due to their complex fabrication. Further, it may be challenging and may require great effort to customize these devices for specific applications. Additionally, most devices suffer from a low fill factor such that only a small portion of a sensor area can be used for imaging. A particular challenge may be their susceptibility to fabrication tolerances and/or an angle of incidence of incident light. Further, most systems may require complex algorithm for evaluation and, thus, high resources in computing power.

Problem to be Solved

It is therefore desirable to provide an imaging device and a method for imaging at least one object which at least partially address above-mentioned technical challenges. Specifically, an imaging device and a method shall be proposed which provide cost-efficient and flexible way for imaging objects, specifically for single-shot or snapshot multispectral or hyperspectral imaging.

SUMMARY

This problem is addressed by an imaging device and a method for imaging at least one object with the features of the independent claims. Advantageous embodiments which might be realized in an isolated fashion or in any arbitrary combinations are listed in the dependent claims as well as throughout the specification.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, an imaging device for imaging at least one object, specifically for multispectral imaging or hyperspectral imaging, is disclosed. The term "imaging" as used herein is a broad term and is to be given its ordinary and customary meaning to a person of ordinary skill in the art and is not to be limited to a special or customized meaning. The term specifically may refer, without limitation, to a process of recording optical data in a spatially resolved fashion, specifically to the process of image recording, image acquisition and/or image capturing. The term "image" may refer to data recorded by using an optical acquisition device, such as a plurality of electronic readings from the optical acquisition device. An image specifically may comprise optical measurement data recorded in a spatially resolved fashion, such as intensity values of an array of optical sensors, such as CCD or CMOS sensors, e.g. a 2D array. Thus, as an example, an image may comprise an array, specifically a 2D array, of image values, such as intensity values. The imaging may comprise capturing a single image and/or a plurality of images such as a sequence of images like e.g. a video clip or video sequence. For example, the imaging may comprise recording continuously a sequence of images such as a video or a movie. The imaging may be initiated by the user action or may automatically be initiated, e.g. once the presence of the at least one object within a field of view and/or within a predetermined sector of the field of view is automatically detected. These automatic image acquisition techniques are known e.g. in the field of automatic barcode readers, such as from automatic barcode reading apps. Alternatively or additionally, the imaging may comprise a process of forwarding or transmitting light, such as by using one or more optical elements, specifically for the purpose of acquiring and/or capturing the transmitted light such as by an optical acquisition device.

The term "multispectral imaging", also referred to as "hyperspectral imaging", as used herein is a broad term and is to be given its ordinary and customary meaning to a person of ordinary skill in the art and is not to be limited to a special or customized meaning. The term specifically may refer, without limitation, to an imaging process for obtaining multispectral or hyperspectral images. The terms "multispectral imaging" or "hyperspectral imaging" may, specifically, refer to a process of recording, acquiring and/or capturing data, such as at least one image, such as a spectral irradiance of the object, in a spatially resolved fashion, such as by recording separate images for at least two different colors. Specifically, the multispectral imaging or hyperspectral imaging may comprise recording, acquiring and/or capturing data, specifically image data, in at least three dimensions, wherein at least two dimensions refer to spatial dimensions and at least one dimension refers to a spectral dimension, such as a dimension representing a wavelength or a frequency domain. Specifically, in multispectral imaging or hyperspectral imaging, the spectral dimension may be sampled by more than three elements in the wavelength or frequency domain.

The term "object" as used herein is a broad term and is to be given its ordinary and customary meaning to a person of ordinary skill in the art and is not to be limited to a special or customized meaning. The term specifically may refer, without limitation, to an arbitrary body, chosen from a living object and a non-living object. Thus, as an example, the at least one object may comprise one or more articles and/or one or more parts of an article, wherein the at least one article or the at least one part thereof may comprise at least one component which may provide a spectrum suitable for investigations. Additionally or alternatively, the object may be or may comprise one or more living beings and/or one or more parts thereof, such as one or more body parts of a human being, e.g. a user, an animal and/or a plant.

The term "imaging device" as used herein is a broad term and is to be given its ordinary and customary meaning to a person of ordinary skill in the art and is not to be limited to a special or customized meaning. The term specifically may refer, without limitation, to an apparatus configured for performing at least one process of imaging. Specifically, the imaging device may be capable of recording a signal intensity with respect to a corresponding wavelength or wavelength interval, wherein the signal intensity may preferably be provided as an electrical signal, which may, optionally, be used for further evaluation. The imaging device may specifically comprise one or more optical elements, as will be outlined in further detail below, for directing or transmitting light irradiated from the object or from a light source irradiating the object onto an optical acquisition device, which may specifically be configured for recording the signal intensity. The imaging device may specifically be configured for at least one of multispectral imaging and hyperspectral imaging.

The imaging device comprises:
I. at least one image sensor located in at least one image plane of the imaging device, the image sensor comprising a plurality of photosensitive elements;
II. at least one first imaging system configured for generating at least one intermediate image of the object in at least one intermediate image plane;
III. at least one second imaging system configured for generating at least one image of the intermediate image on the image sensor in the image plane;
IV. at least one diffractive optical element arranged in the intermediate image plane; and
V. at least one aperture arranged in a beam path of the second imaging system between the intermediate image plane and the image sensor, wherein the diffractive optical element, the second imaging system and the aperture are arranged such that at least two different images for at least two different wavelengths of the intermediate image are generated on at least two different groups of the photosensitive elements.

The term "image sensor" as used herein is a broad term and is to be given its ordinary and customary meaning to a person of ordinary skill in the art and is not to be limited to a special or customized meaning. The term specifically may refer, without limitation, to at least one sensor device having at least one imaging element configured for recording or capturing spatially resolved one-dimensional, two-dimensional or even three-dimensional optical data or information. The image sensor may be responsive to incident illumination or light and may be configured for generating an electrical signal indicating an intensity of the incident illumination or light. The image sensor may be sensitive in one or more of a visible spectral range, an ultraviolet spectral range, an infrared spectral range or a near infrared spectral range (NIR). The image sensor, specifically, may comprise an array of photosensitive elements, such as an array of CCD and/or CMOS elements, capable of recording light intensities. As an example, the imaging device may comprise a linear array and/or a two-dimensional array of photosensitive elements. As an example, the image sensor may comprise at least one electronic image sensor, such as at least one CCD chip and/or at least one CMOS chip configured for recording images. The image sensor may specifically be a pixelated images sensor comprising a plurality of imaging elements or pixel sensors. The image sensor may specifically comprise at least one monochrome image sensor, specifically a monochrome image sensor in which all photosensitive elements exhibit identical or at least widely identical wavelength-dependencies of their respective sensitivities.

The image sensor comprises the plurality of photosensitive elements. The term "photosensitive element" as used herein is a broad term and is to be given its ordinary and customary meaning to a person of ordinary skill in the art and is not to be limited to a special or customized meaning. The term specifically may refer, without limitation, to an imaging element of the image sensor. Specifically, the image sensor may comprise an array or a matrix of individual imaging elements, wherein the individual imaging elements are referred to as "photosensitive element". Each photosensitive element may have at least one photosensitive area configured for recording a photoresponse that depends on an intensity of incident light impinging on the particular photosensitive area, for example by generating at least one output signal indicative of the intensity of incident light. The photosensitive area comprised by each individual photosensitive element may, especially, be a single, uniform area which may be designated for receiving incident light impinging on the photosensitive area. The output signal of the photosensitive element, specifically the output signal of the plurality of photosensitive elements, may, in particular, be used as the image sensor's signal and may be provided to an external evaluation unit for further evaluation.

The term "image plane" as used herein is a broad term and is to be given its ordinary and customary meaning to a person of ordinary skill in the art and is not to be limited to a special or customized meaning. The term specifically may refer, without limitation, to an arbitrary location of image formation or generation. Specifically, the image plane may be a two-dimensional, in particular flat, surface in which the image of the object may be generated. Specifically, a real image of the object may be generated in the image plane. The image plane may be a focal plane of the imaging device, specifically of the second imaging system, more specifically of a last lens of the second imaging system. However, the image plane may also be an arbitrary image plane, specifically an image plane at least partially deviating from the focal plane of the second imaging system.

As outlined above, the imaging device comprises the at least one first imaging system configured for generating the at least one intermediate image of the object in the at least one intermediate image plane. The term "system" as used herein is a broad term and is to be given its ordinary and customary meaning to a person of ordinary skill in the art and is not to be limited to a special or customized meaning. The term specifically may refer, without limitation, to an arbitrary set of interacting or interdependent components forming a whole. Specifically, the components of a system may be configured for interacting with each other in order to jointly fulfill at least one common function. The components of a system may be handled independently or may be coupled or connectable.

As used herein, the term "imaging system" as used herein is a broad term and is to be given its ordinary and customary meaning to a person of ordinary skill in the art and is not to be limited to a special or customized meaning. The term specifically may refer, without limitation, to a system comprising one or more optical components, wherein the system is configured for imaging at least one object into at least one image plane, e.g. with or without magnification.

The terms "first" and "second", as used herein, are used for nomenclature purposes, only, without implying any ranking and without restricting the fact that more than two imaging systems may be given.

Consequently, the "first imaging system" as used herein is a broad term and is to be given its ordinary and customary meaning to a person of ordinary skill in the art and is not to be limited to a special or customized meaning. The term specifically may refer, without limitation, to an imaging system as defined above, denoted by "first". The first imaging system specifically may be a system comprising a set of one or more optical components. The optical components of the first imaging system may interact with each other in order to fulfill at least one function of imaging. The first imaging system specifically may comprise one or more optical elements selected from the group consisting of: a lens, specifically a spherical lens and/or a sphero-cylindrical lens, more specifically a biconvex lens, a biconcave lens, a plano-convex lens, a plano-concave lens and/or a convex-concave lens; a prism; a beam splitter; a mirror; an aperture stop; a waveplate; a reflective optical element such as a mirror; a diffractive optical element or a gradient-index (GRIN) lens. Specifically, the first imaging system may be or may comprise at least one lens system comprising one or more refractive or reflective, spherical or non-spherical surfaces. For example, the first imaging system may be or may comprise at least one lens system comprising one or more spherical lenses. Additionally or alternatively, other types of lenses may also be comprised, such as one or more cylindrical lenses. The first imaging system may be located next to the object to be imaged. The first imaging system may receive light originating from the object, such as light reflected, transmitted and/or emitted from the object, and may transmit the received light. The first imaging system may be configured for transmitting light originating from the object to the intermediate image plane to generate the at least one intermediate image.

The term "intermediate image" as used herein is a broad term and is to be given its ordinary and customary meaning to a person of ordinary skill in the art and is not to be limited to a special or customized meaning. The term specifically may refer, without limitation, to an image generated by using an imaging system, wherein the image is intended to be further imaged by at least one further imaging system, thereby forming at least one secondary image, e.g. by the first imaging system. The intermediate image may be or may comprise a real image generated by the first imaging system. The intermediate image may be a real image of the object, such as an image of the object which can be imaged on a screen or the like. The intermediate image may be an optically modified image, such as an optically magnified, diminished, rotated and/or mirrored image. The intermediate image may specifically be a full-color or partial color image, in particular having full color or partial color information of the object to be imaged.

The term "intermediate image plane" as used herein is a broad term and is to be given its ordinary and customary meaning to a person of ordinary skill in the art and is not to be limited to a special or customized meaning. The term specifically may refer, without limitation, to an arbitrary location of intermediate image formation or generation. The intermediate image plane may be a two-dimensional, in particular flat or curved, surface in which the intermediate image of the object may be generated. Specifically, a real image of the object may be generated in the intermediate image plane by using the first imaging system. The intermediate image plane may, as an example, be a focal plane of the first imaging system, specifically of a last lens of the first imaging system. However, the intermediate image plane may also be an arbitrary image plane, specifically an image plane at least partially deviating from the focal plane of the first imaging system.

As further outlined above, the imaging device comprises the at least one second imaging system configured for generating the at least one image of the intermediate image on the image sensor in the image plane. The term "second imaging system" as used herein is a broad term and is to be given its ordinary and customary meaning to a person of ordinary skill in the art and is not to be limited to a special or customized meaning. The term specifically may refer, without limitation, to an imaging system as defined above, denoted by "second". The second imaging system specifically may be a system comprising a set of one or more optical components. The optical components of the second imaging system may interact with each other in order to fulfill at least one function of imaging. The second imaging system may comprise one or more optical elements selected from the group consisting of: a lens, specifically a spherical lens and/or a sphero-cylindrical lens, more specifically a biconvex lens, a biconcave lens, a plano-convex lens, a plano-concave lens and/or a convex-concave lens; a prism; a beam splitter; a mirror; an aperture stop; a waveplate; a reflective optical element such as a mirror; a diffractive optical element and a gradient-index (GRIN) lens. Specifically, the second imaging system may be or may comprise at least one lens system comprising one or more refractive or reflective, spherical or non-spherical surfaces. For example, the second imaging system may be or may comprise at least one lens system comprising one or more spherical lenses. Additionally or alternatively, other lenses may also be comprised. Thus, the second imaging system may also comprise one or more cylindrical lenses. The second imaging system may be located next to the diffractive optical element, specifically in a beam path subsequent to the first imaging system. The second imaging system may receive light diffracted by the diffractive optical element and may transmit the received light to the image sensor. The second imaging system may be configured for transmitting light originating from the intermediate image plane to the image sensor in the image plane to generate the at least one image.

The term "diffractive optical element" as used herein is a broad term and is to be given its ordinary and customary meaning to a person of ordinary skill in the art and is not to be limited to a special or customized meaning. The term specifically may refer, without limitation, to an optical device having at least one structure, such as a periodic structure and/or diffracting structure, configured for diffracting light into multiple beams of different diffraction angles. The diffractive optical element may comprise a single periodic structure or a plurality of periodic structures arranged next to each or at least partially in an overlapping fashion, such as a superposition of a plurality of individual periodic structures. The diffraction angles of the multiple beams may depend on an angle of incidence of light on the diffractive optical element, the periodic structure of the diffractive optical element, specifically a spacing or a distance between adjacent diffracting elements of the periodic structure, and/or a wavelength of the incident light. The periodic structure of the diffractive optical element may be described by a grating period comprising a numerical indication of the spacing or the distance between adjacent diffracting elements of the periodic structure, e.g. in a frequency space or in a position space. Thus, as an example, the grating period may comprise a number of lines or generally repeating structural elements per length unit, e.g. per millimeter. The diffractive optical element may act as a dispersive element. Thus, light having different wavelengths may be diffracted at different diffraction angles at the diffractive optical element, whereas light of the same wavelength may be diffracted at the same diffraction angles.

The diffractive optical element may comprise at least one of a transmissive and a reflective diffractive optical element. For example, phase modulating, amplitude modulating or complex modulating diffracting elements may be employed. The diffractive optical element may, as an example comprise lithographically fabricated phase elements.

The diffractive optical element may comprise at least one grating being selected from the group of a transmissive and a reflective grating. The grating may comprise at least two different grating regions having at least two different grating periods. The grating regions may specifically refer to regions of the diffractive optical element having a constant periodic structure, such as a constant grating period. Alternatively or additionally, different complex diffractive structures may also be possible. The grating regions may be arranged in at least one pattern selected from the group consisting of: a stripe pattern, a concentric ring pattern, a checkerboard pattern. However, any other pattern or complex shape is also feasible. The differing grating periods may differ by a difference Δd of 5 nm to 50 µm, such as by at least 5 nm to 50 µm.

Further, the grating regions may comprise at least two differing groups of micro-regions having differing grating periods, each group comprising a plurality of micro-regions having a constant grating period. Specifically, each group comprising the plurality of micro-regions may comprise at least one diffracting structure, such as a diffracting structure having similar diffracting properties. The groups of micro-regions may be arranged in a macro-pattern, specifically in a repeating macro-pattern. The macro-pattern may be an application-specific macro pattern. For example, the diffractive optical element may be a lithographically fabricated diffractive optical element. For each application of the imaging device, a different macro-pattern of the diffractive optical element may be used.

The diffractive optical element may be arranged interchangeably in the imaging device. Thus, for each specific application, a different diffractive optical element may be used, wherein the diffractive optical element may be easily changed in the imaging device in between two applications.

Further, as outlined above, the imaging device comprises the at least one aperture arranged in the beam path of the second imaging system between the intermediate image plane and the image sensor. The term "aperture" as used herein is a broad term and is to be given its ordinary and customary meaning to a person of ordinary skill in the art and is not to be limited to a special or customized meaning. The term specifically may refer, without limitation, to an optical element having at least one hole or opening for transmitting light there through. Specifically, light irradiating the aperture may only be transmitted through the at least one hole or opening of the aperture. Thus, the aperture may comprise at least one non-transparent material. The opening or hole of the aperture may have a regular shape, such as a circular or a rectangular shape, or an irregular shape, such as a polygonal shape. The aperture may also be referred to as "aperture stop".

The term "beam path" as used herein is a broad term and is to be given its ordinary and customary meaning to a person of ordinary skill in the art and is not to be limited to a special or customized meaning. The term specifically may refer, without limitation, to a trajectory of propagating light. Specifically, the beam path may describe a trajectory of light propagating through the imaging device. The beam path may be defined by considering the propagation of light through the imaging device. Specifically, the beam path may be determined following a "geometrical optics"- or "ray optics"-model considering that light propagation can be described by light rays. These models and methods are generally known to the skilled person. Within the context of these models, the beam may be referred to as a light ray.

As outlined above, the diffractive optical element, the second imaging system and the aperture are arranged such that the at least two different images for the at least two different wavelengths of the intermediate image are generated on the at least two different groups of the photosensitive elements. Thus, specifically, the diffractive optical element and the aperture, in conjunction, may act as a wavelength-selective spatial filter, configured for directing the intermediate image onto the image sensor, such that at least two different images, also referred to as partial images, of the intermediate image for at least two different wavelengths or colors are generated on the at least two different groups of the photosensitive elements.

The term "group of photosensitive elements" as used herein is a broad term and is to be given its ordinary and customary meaning to a person of ordinary skill in the art and is not to be limited to a special or customized meaning. The term specifically may refer, without limitation, to an assemblage of multiple photosensitive elements. Specifically, the group of photosensitive elements may be assembled according to at least one common characteristic. The common characteristic may be a specific wavelength or wavelength interval in which the group of photosensitive elements are recording a photoresponse. Thus, the at least two different groups of photosensitive elements may be configured for recording the at least two different images, each of the images having a specific wavelength or wavelength interval. Each photosensitive element of the image sensor may be associated to one of the at least two groups of photosensitive elements. The grouping of the photosensitive elements may be dependent on the diffractive optical element, specifically on an arrangement of the diffractive optical element, the second imaging system and the aperture in the imaging device. A spatial extension or coverage of the at least two different groups of photosensitive elements may overlap, such that, as an example, the smallest possible area covering the first group of photosensitive elements may overlap with a smallest possible area covering the at least one second group of photosensitive elements. As an example, the first and second groups of photosensitive elements may interleave, even though the photosensitive elements of the first and second groups may not be not identical.

It may be possible to obtain more than two groups of photosensitive elements. For example, the diffractive optical element, the second imaging system and the aperture may be arranged such that at least three different images for at least three different wavelengths of the intermediate image are generated on at least three different groups of the photosensitive elements. Specifically, the diffractive optical element, the second imaging system and the aperture may be arranged such that at least four different images for at least four different wavelengths of the intermediate image are generated on at least four different groups of the photosensitive elements. Specifically, the diffractive optical element, the second imaging system and the aperture may be arranged such that at least five different images for at least five different wavelengths of the intermediate image are generated on at least five different groups of the photosensitive elements. More specifically, the diffractive optical element, the second imaging system and the aperture may be arranged such that at least nine different images for at least nine different wavelengths of the intermediate image are generated on at least nine different groups of the photosensitive elements. Most specifically, the diffractive optical element, the second imaging system and the aperture may be arranged such that at least an arbitrary number n of different images for at least an arbitrary number n of wavelengths of the intermediate image are generated on at least an arbitrary number n of groups of the photosensitive elements, wherein n is a positive integer.

The at least two different images may comprise at least one first image for at least one first wavelength, i.e. at least one first color image, and at least one second image for at least one second wavelength, i.e. at least one second color image. Specifically, the first image may be an image obtained by image sensor's readings from a first group of photosensitive elements of the at least two different groups of the photosensitive elements, wherein the second image may be an image obtained by the image sensor's readings from a second group of photosensitive elements of the at least two different groups of the photosensitive elements. The diffractive optical element, the second imaging system and the aperture may be arranged such that the first wavelength being diffracted at a first grating region of the diffractive optical element may pass the aperture, wherein the second wavelength being diffracted at the first grating region of the diffractive optical element may be blocked by the aperture. Additionally, the diffractive optical element, the second imaging system and the aperture may be arranged such that the first wavelength being diffracted at a second grating region of the diffractive optical element may be blocked by the aperture, wherein the second wavelength being diffracted at the second grating region of the diffractive optical element may pass the aperture.

The first imaging system may comprise at least one first imaging aperture and at least one first imaging lens. The first imaging system may specifically comprise at least one image-sided telecentric imaging system. However, in principle, it may also be possible to use a non-telecentric first imaging system. The term "image-sided telecentric" as used herein is a broad term and is to be given its ordinary and customary meaning to a person of ordinary skill in the art and is not to be limited to a special or customized meaning. The term specifically may refer, without limitation, to a characteristic of an imaging system of providing a constant magnification of the object to be imaged, in particular a constant magnification independent of a distance between the imaging system and a screen, image sensor or the like. Thus, the image-sided telecentric imaging system may be an imaging system having an exit pupil at infinity. As an example, the first imaging system may comprise the at least one first imaging aperture and the at least one first imaging lens. The first imaging lens may specifically be a biconvex lens. The first imaging aperture may be arranged in an object-sided focal plane of the first imaging lens. A size, in particular a diameter, of an exit pupil of the first imaging system may, optionally, correspond to a size, in particular to a diameter, of an entrance pupil of the second imaging system. The size of the exit pupil of the first imaging system may correspond to the size of the entrance pupil of the second imaging system such that both the entrance pupil and the exit pupil have a size in the range of 50 µm to 100 mm.

The second imaging system may comprise at least one of a double-sided telecentric imaging system, an object-sided telecentric imaging system and a non-telecentric imaging system. The "object-sided telecentric" as used herein is a broad term and is to be given its ordinary and customary meaning to a person of ordinary skill in the art and is not to be limited to a special or customized meaning. The term specifically may refer, without limitation, to a characteristic of an imaging system of providing a constant magnification of the object to be imaged, in particular a constant magnification independent of a distance between the imaging system and the object. Thus, the object-sided telecentric imaging system may be an imaging system having an entrance pupil at infinity. Consequently, the term "double-sided telecentric", as used herein, may refer, without limitation, to a characteristic of an imaging system of being both image-sided telecentric and object-sided telecentric.

As an example, the second imaging system may comprise at least one second imaging aperture and at least two second imaging lenses. The second imaging lenses may specifically be biconvex lenses. The second imaging aperture may be arranged in between the two second imaging lenses. Specifically, the second imaging aperture may be arranged in a plane in order to filter the wavelength dependent light distribution generated by the diffractive optical element. The second imaging aperture may specifically be arranged in an image-sided focal plane of the first of the two second imaging lenses. In this example, the second imaging system may be an object-sided imaging system. Thus, object-sided telecentricity may be achieved for the second imaging system, specifically being a 4-f system, by arranging the second imaging aperture in the image sided focal plane of the first of the two second imaging lenses. However, other examples of achieving object-sided telecentricity are also feasible. Additionally or alternatively, the second imaging aperture may be arranged in an object-sided focal plane of the second of the two second imaging lenses. In this example, the second imaging system may be a double-sided imaging system.

The imaging device may further comprise at least one evaluation unit. The term "evaluation unit" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the evaluation unit may be configured for processing basic instructions that drive the computer or system. The evaluation unit may comprise at least one processor. As an example, the evaluation unit may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the evaluation unit may be a multi-core processor. Specifically, the evaluation unit may be or may comprise a central processing unit (CPU). Additionally or alternatively, the evaluation unit may be or may comprise a microprocessor, thus specifically the processor's elements may be contained in one single integrated circuitry (IC) chip. Additionally or alternatively, the evaluation unit may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The evaluation unit may specifically be configured, such as by software programming, for performing one or more evaluation operations.

The evaluation unit may be configured for performing a spectral analysis of the object by evaluating signals of the different groups of photosensitive elements. The spectral analysis may comprise an acquisition of a snapshot multispectral or hyperspectral image. The snapshot multispectral or hyperspectral image, also referred to as single-shot multispectral or hyperspectral image, may specifically be a multispectral or hyperspectral image being acquired at a single shot.

The imaging device may be configured for operating in a spectral range at least partially comprising one or more of a visible spectral range, an infrared spectral range and an ultraviolet spectral range of electromagnetic radiation, specifically a range of electromagnetic radiation having wavelengths from 10 nm to 100 µm, more specifically from 380 nm to 750 nm, most specifically from 510 nm to 700 nm. Specifically, the diffractive optical element may be configured for diffracting electromagnetic radiation in the spectral range. Additionally or alternatively, the image sensor, specifically the plurality of photosensitive elements, may be sensitive for electromagnetic radiation in the spectral range.

In a further aspect of the present invention, a method for imaging at least one object, specifically for multispectral imaging or hyperspectral imaging, is disclosed. The method comprises the following steps, which, as an example, may be performed in the given order. It shall be noted, however, that a different order is also possible. Further, it is possible to perform one or more of the method steps once or repeatedly. Further, it is possible to perform two or more of the method steps simultaneously or in a timely overlapping fashion. The method may comprise further method steps which are not listed.

The Method Comprises:
i. generating at least one intermediate image of the object in at least one intermediate image plane by using at least one first imaging system; and
ii. generating at least one image of the intermediate image on at least one image sensor located in at least one image plane by using at least one second imaging system, wherein the image sensor comprises a plurality of photosensitive elements, wherein step ii. comprises using at least one diffractive optical element arranged in the intermediate image plane and at least one aperture arranged in a beam path of the second imaging system between the intermediate image plane and the image sensor, wherein the diffractive optical element, the second imaging system and the aperture are arranged such that at least two different images for at least two different wavelengths of the intermediate image are generated on at least two different groups of the photosensitive elements.

The method may specifically comprise using at least one imaging device according to the present invention, such as according to any one of the embodiment disclosed above and/or any one of the embodiments disclosed in further detail below. Thus, for definitions and/or embodiment related to the method, reference may be made to the description of the imaging device as described in further detail above.

Additionally or alternatively, the method may further comprise performing a spectral analysis of the object by evaluating signals of the different groups of photosensitive elements. Specifically, the spectral analysis may comprise an acquisition of a snapshot multispectral or hyperspectral image.

The imaging device and the method according to the present invention may provide a large number of advantages over known methods and devices. Specifically, the imaging device and the method for imaging the object may provide enhanced flexibility in the field of multispectral imaging or hyperspectral imaging, specifically for single-shot or snapshot multispectral or hyperspectral imaging. The diffractive optical element of the imaging device may be easily changed and, thus, may be adapted according to a specific application, for example in view of a spectral and/or lateral resolution of the imaging device. In particular, the spectral and/or lateral resolution may be varied over the image sensor's photosensitive area. For example, the diffractive optical element may comprise large-area micro-gratings. In this example, the diffractive optical element may have a high lateral resolution and a diminished spectral resolution. In another example and by using the diffractive optical element comprising a plurality of small-area micro-regions, it may be possible to provide a high spectral resolution but a diminished lateral resolution. In addition, these characteristics of the imaging device may be easily changed by changing the diffractive optical element, specifically without the need for further adaptions in the imaging device. For example and in contrast to many known systems and methods, the detected wavelength interval may be easily and flexibly adapted to a specific application. Further, the imaging device may provide a simple assembly allowing a low-cost setup for multispectral or hyperspectral imaging. The imaging device and the method, in contrast to many known systems and methods, may overcome the need for complex evaluation and reconstruction algorithms.

Specifically, the object and/or a scene comprising the at least one object may be imaged by using the first imaging system onto the diffractive optical element. The diffractive optical element may comprise a plurality of micro-regions having different grating periods, wherein the groups of micro-regions may be arranged in an application-specific pattern. The intermediate image being generated on the diffractive optical element may be divided according to the pattern of the groups of micro-regions on the diffractive optical element. Depending on the grating period of the micro-region at a specific point on the diffractive optical element, a particular wavelength may be transmitted by the second imaging system to the image sensor. Specifically, a diffraction angle at the diffractive optical element may have to fit with the arrangement of the second imaging system and the aperture in order to transmit the particular wavelength from the specific point. Other wavelength at this point may be blocked by the aperture. The micro-regions may be arranged such that at least two different wavelength may be transmitted. It may be possible to overlap micro-regions in order to transmit more than one wavelength from a specific point. Thus, by using the imaging device comprising the diffractive optical element, which may, optionally, comprise the macro pattern of groups of micro-regions, it may be possible to obtain a spatially resolved optical filtering in the intermediate image plane. Therefore, the imaging device may be used for an application-specific spatially resolved spectral analysis of the object and/or the scene of the objet.

A scene to be analyzed may be imaged onto an intermediate image plane using the first imaging system. In the intermediate image plane, an application-specific pattern of micro-regions may be located. This pattern may be realized as a lithographically fabricated diffractive optical element (DOE). The local grating period d of the diffractive optical element may then determine a deflection angle of the ray bundles for a given wavelength $\lambda$. A chief ray may be deflected according to the grating equation $\sin \phi = \lambda/d$. The intermediate image may be imaged by the second imaging system, which may specifically be carried out as a double-sided telecentric system, onto the image sensor. In principle, object-sided telecentricity may be advantageous, but for most image sensors it is also advantageous if the angle of incidence of the light is small. The aperture may be used for spectral filtering.

Only parts of the spectrum may be able to pass the aperture. The blocked wavelength may pass the aperture from other field positions, if the grating period at these positions produce the correct diffraction angle for this wavelength. All micro-regions having the same grating period may lead to the same angular deviation of the ray bundles and, therefore, the same spectral band being able to pass the aperture if telecentric imaging systems are used. On the monochrome image sensor, only the areas of the image whose wavelength matches the design wavelength of the grating may appear bright.

A width of the aperture may determine the spectral bandwidth for the spectral filtering of the imaging device. On the other hand, it may also determine the lateral resolution of the imaging the intermediate image onto the image sensor. In addition, an exit pupil diameter of the first imaging system may fit to the entrance pupil diameter of the second imaging system. In other words, the first imaging aperture of the first imaging system may have to be imaged onto the second imaging aperture of the second imaging system.

In the following, a one-dimensional estimation of the resulting spectral response for imaging a point (X, Y) in the object plane may be derived, without wishing to be bound by this theory. The estimation is based on the assumption that at a certain wavelength $\lambda_0$, the light will pass the aperture of the second imaging system. A shift of the wavelength $\Delta\lambda$ may lead to a shift $\Delta x$ of the raybundle on the filter plane. $\Delta x$ is approximated by $$\Delta x = f_1 \tan\Delta\phi \approx f_1 \sin\Delta\phi \approx \frac{f_1}{d}\Delta\lambda, \quad (1)$$

where the focal length of the first of the two second imaging lenses denoted by $f_1$ and the change of the diffraction angle is denoted by $\Delta\phi$. The grating period is denoted by d. Note that the approximation used in equation (1) may only be valid for small angels.

For simplicity, the imaging device may be described in a one-dimensional model. In this model, the filtering aperture with diameter $D_2$ may be described by a rect-function with width $D_2$. The amplitude distribution due to a certain object point may also have a width of $D_2$ for one wavelength $\lambda_0$.

At a certain wavelength $\lambda = \lambda_0 + \Delta\lambda$, the corresponding rectangular amplitude distribution may be shifted by $\Delta x$. The allowed shift may be given by $$\frac{D_2}{2} = \Delta x = \frac{f_1}{d}\Delta\lambda. \quad (2)$$

The spectral full-width half-maximum (FWHM) corresponds to $\pm\Delta\lambda$, therefore, $$FWHM = 2 \cdot \Delta\lambda = \frac{D_2 d}{f_1} \quad (3)$$

For an arbitrary $\Delta\lambda$ the amplitude distribution $\Phi(\Delta\lambda)$ after the filter may be $$\Phi(\Delta\lambda, d) = \int_{-\infty}^{\infty} rect(x/D_2) \cdot rect\left(\frac{x - \Delta x}{D_2}\right) dx \quad (4)$$

$$= \int_{-\infty}^{\infty} rect(x/D_2) \cdot rect\left(\frac{x}{D_2} - \frac{f_1}{D_2 d}\Delta\lambda\right) dx \quad (5)$$

With $x':=-x/D_2$ the following is obtained:

$$\Phi(\Delta\lambda, d) = \int_{-\infty}^{\infty} rect(-x') \cdot rect\left(-\frac{f_1}{D_2 d}\Delta\lambda - x'\right)dx'. \quad (6)$$

By considering the y-axis symmetry of the rect-function rect(−x)=rect(x) it may follow:

$$\Phi(\Delta\lambda, d) = \int_{-\infty}^{\infty} rect(x') \cdot rect\left(-\frac{f_1}{D_2 d}\Delta\lambda - x'\right)dx' \quad (7)$$

$$= rect\left(\frac{f_1}{D_2 d}\Delta\lambda\right) * rect\left(\frac{f_1}{D_2 d}\Delta\lambda\right) \quad (8)$$

$$= triang\left(\frac{f_1}{D_2 d}\Delta\lambda\right), \quad (9)$$

where the convolution is denoted by $$f(x)=g(x)*h(x):=\int_{-\infty}^{\infty} g(x')h(x-x')dx' \quad (10)$$

and again the FWHM is given by equation (3).

With the one dimensional lateral resolution, corresponding to the well known resolution 1.22·λ/NA for circular apertures, the resolution in the object plane may be $$\Delta X = 1.0 \cdot \frac{\lambda f_1}{D_2}. \quad (11)$$

The uncertainty relation for spectral and lateral resolution may be:

$$\Delta X \cdot FWHM \geq \lambda \cdot d \quad (12)$$

For example, for a lateral resolution of $\Delta X=50$ μm and a grating period d of 2.5 μm, a FWHM of 30 nm at $\lambda=600$ nm may be obtained.

$\Delta X$ may specifically be the physical resolution defined by the imaging device. However, if nine, for example three times three, spectral channels may be used, the spatial resolution may be effectively reduced, similar to the typical Bayer-like mosaics, in this example by a factor of at least three.

However, for a two-dimensional imaging model, the rect-functions may have to be replaced by circ-functions. The triang-result of equation (9) then may become an arccos-function, similar to the optical transfer function for aberration free incoherent imaging for a circular pupil. The difference, however, may be negligible so that, in the following, equation (9) may be used. The one-dimensional model may also be valid if slit apertures perpendicular to the dispersion direction may be used in the imaging device. This may result in having the resolution as described in equation (12) along one image sensor axis, where the other axis may be unaffected by the filtering.

The result of equation (9) may correspond to a case for an extended grating. However, if holograms consisting of a pixelated pattern of micro-regions might be used, additional complications may arise at the transition from one grating to the next. Due to the limited spatial resolution of the imaging, a point in the image plane may receive light from an extended patch in the object plane. This patch may fall onto the transition between two micro-regions. The point may receive light from two different gratings and, therefore see equation (9), with two different spectral distributions.

As a result, a weighted sum $\Gamma$ of two spectral distributions may be considered. The weight may be proportional to the corresponding, incoherent point spread function (PSF) of the imaging:

$$\Gamma(\Delta\lambda)=\int_{x_0}^{x_1} PSF(x) \cdot \Phi(\Delta\lambda,d_1)dx + \int_{x_1}^{x_2} PSF(x) \cdot \Phi(\Delta\lambda,d_2)dx \quad (13)$$

$$=\Phi(\Delta\lambda,d_1) \cdot \int_{x_0}^{x_1} PSF(x)dx + \Phi(\Delta\lambda,d_2) \cdot \int_{x_1}^{x_2} PSF(x)dx \quad (14)$$

where $x_0$ and $x_2$ correspond to the overall extension of the PSF, $x_1$ denotes the position of the transition between the gratings $d_1$ and $d_2$. For an aberration free imaging, it may be possible to use the incoherent PSF, e.g. the Airy function. This may lead to a noteworthy broadening of the spectral response only, if the grating periods are considerably different and the gratings are small. For larger gratings, specifically compared to the PSF extension in object space, the broadening may only be visible at the position of the transitions.

Summarizing and without excluding further possible embodiments, the following embodiments may be envisaged:

Embodiment 1: An imaging device for imaging at least one object, specifically for multispectral imaging or hyperspectral imaging, comprising
 I. at least one image sensor located in at least one image plane of the imaging device, the image sensor comprising a plurality of photosensitive elements;
 II. at least one first imaging system configured for generating at least one intermediate image of the object in at least one intermediate image plane;
 III. at least one second imaging system configured for generating at least one image of the intermediate image on the image sensor in the image plane;
 IV. at least one diffractive optical element arranged in the intermediate image plane; and
 V. at least one aperture arranged in a beam path of the second imaging system between the intermediate image plane and the image sensor,
wherein the diffractive optical element, the second imaging system and the aperture are arranged such that at least two different images for at least two different wavelengths of the intermediate image are generated on at least two different groups of the photosensitive elements.

Embodiment 2: The imaging device according to the preceding embodiment, wherein the diffractive optical element comprises at least one of a transmissive and a reflective diffractive optical element.

Embodiment 3: The imaging device according to any one of the preceding embodiments, wherein the diffractive optical element comprises at least one grating being selected from the group of a transmissive and a reflective grating.

Embodiment 4: The imaging device according to the preceding embodiment, wherein the grating comprises at least two different grating regions having at least two different grating periods.

Embodiment 5: The imaging device according to the preceding embodiment, wherein the grating regions are arranged in at least one pattern selected from the group consisting of: a stripe pattern, a concentric ring pattern, a checkerboard pattern.

Embodiment 6: The imaging device according to any one of the two preceding embodiments, wherein the grating regions comprise at least two differing groups of micro-regions having differing grating periods, each group comprising a plurality of micro-regions having a constant grating period, wherein the groups of micro-regions are arranged in a macro-pattern, specifically in a repeating macro-pattern.

Embodiment 7: The imaging device according to the preceding embodiment, wherein the macro-pattern is an application-specific macro pattern.

Embodiment 8: The imaging device according to any one of the four preceding embodiments, wherein the differing grating periods differ by at least 5 nm up to 50 µm or by at least 5 nm up to 50 µm.

Embodiment 9: The imaging device according to any one of the preceding embodiments, wherein the diffractive optical element is arranged interchangeably in the imaging device.

Embodiment 10: The imaging device according to any one of the preceding embodiments, wherein the diffractive optical element, the second imaging system and the aperture are arranged such that at least three different images for at least three different wavelengths of the intermediate image are generated on at least three different groups of the photosensitive elements, specifically at least four different images for at least four different wavelengths of the intermediate image on at least four different groups of the photosensitive elements, more specifically at least five different images for at least five different wavelengths of the intermediate image on at least five different groups of the photosensitive elements, most specifically at least nine different images for at least nine different wavelengths of the intermediate image on at least nine different groups of the photosensitive elements.

Embodiment 11: The imaging device according to any one of the preceding embodiments, wherein the at least two different images comprise at least one first image for at least one first wavelength and at least one second image for at least one second wavelength.

Embodiment 12: The imaging device according to the preceding embodiment, wherein the diffractive optical element, the second imaging system and the aperture are arranged such that the first wavelength being diffracted at a first grating region of the diffractive optical element passes the aperture, wherein the second wavelength being diffracted at the first grating region of the diffractive optical element is blocked by the aperture.

Embodiment 13: The imaging device according to any one of the two preceding embodiments, wherein the diffractive optical element, the second imaging system and the aperture are arranged such that the first wavelength being diffracted at a second grating region of the diffractive optical element is blocked by the aperture, wherein the second wavelength being diffracted at the second grating region of the diffractive optical element passes the aperture.

Embodiment 14: The imaging device according to any one of the preceding embodiments, wherein the first imaging system comprises at least one first imaging aperture and at least one first imaging lens.

Embodiment 15: The imaging device according to the preceding embodiment, wherein the first imaging system comprises at least one image-sided telecentric imaging system, wherein the first imaging aperture is arranged in an object-sided focal plane of the first imaging lens.

Embodiment 16: The imaging device according to any one of the preceding embodiments, wherein a size of an exit pupil of the first imaging aperture corresponds to a size of an entrance pupil of the second imaging system.

Embodiment 17: The imaging device according to any one of the preceding embodiments, wherein the second imaging system comprises at least one of a double-sided telecentric imaging system, an object-sided telecentric imaging system and a non-telecentric imaging system.

Embodiment 18: The imaging device according to the preceding embodiment, wherein the second imaging system comprises at least one second imaging aperture and at least two second imaging lenses, wherein the second imaging aperture is arranged in between the two second imaging lenses.

Embodiment 19: The imaging device according to the preceding embodiment, wherein the aperture is the second imaging aperture.

Embodiment 20: The imaging device according to any one of the two preceding embodiments, wherein the second imaging aperture is arranged in an image-sided focal plane of the first of the two second imaging lenses.

Embodiment 21: The imaging device according to any one of the three preceding embodiments, wherein the second imaging aperture is arranged in an object-sided focal plane of the second of the two second imaging lenses.

Embodiment 22: The imaging device according to any one of the preceding embodiments, wherein the image sensor comprises at least one monochrome image sensor.

Embodiment 23: The imaging device according to any one of the preceding embodiments, further comprising at least one evaluation unit, wherein the evaluation unit is configured for performing a spectral analysis of the object by evaluating signals of the different groups of photosensitive elements.

Embodiment 24: The imaging device according to the preceding embodiment, wherein the spectral analysis comprises an acquisition of a snapshot multispectral or hyperspectral image.

Embodiment 25: The imaging device according to any one of the preceding embodiments, wherein the imaging device is configured for operating in a spectral range at least partially comprising one or more of a visible spectral range, an infrared spectral range and an ultraviolet spectral range of electromagnetic radiation, specifically a range of electromagnetic radiation having wavelengths in at least one of the visible, the infrared and the ultraviolet spectral range, more specifically a range of electromagnetic radiation having wavelengths from 10 nm to 100 µm, more specifically from 380 nm to 750 nm, most specifically from 510 nm to 700 nm.

Embodiment 26: The imaging device according to the preceding embodiment, wherein the diffractive optical element is configured for diffracting electromagnetic radiation in the spectral range.

Embodiment 27: The imaging device according to any one of the two preceding embodiments, wherein the image sensor, specifically the plurality of photosensitive elements, is sensitive for electromagnetic radiation in the spectral range.

Embodiment 28: A method for imaging at least one object, specifically for multispectral imaging or hyperspectral imaging, the method comprising:
  i. generating at least one intermediate image of the object in at least one intermediate image plane by using at least one first imaging system; and
  ii. generating at least one image of the intermediate image on at least one image sensor located in at least one image plane by using at least one second imaging system, wherein the image sensor comprises a plurality of photosensitive elements, wherein step ii. comprises using at least one diffractive optical element arranged in the intermediate image plane and at least one aperture arranged in a beam path of the second imaging system between the intermediate image plane and the image sensor, wherein the diffractive optical element, the second imaging system and the aperture are arranged such that at least two different images for at least two different wavelengths of the intermediate image are generated on at least two different groups of the photosensitive elements.

Embodiment 29: The method according to the preceding embodiment, wherein the method comprises using at least one imaging device according to any one of the preceding embodiments referring to an imaging device.

Embodiment 30: The method according to any one of the two preceding embodiments, wherein the method further comprises performing a spectral analysis of the object by evaluating signals of the different groups of photosensitive elements, wherein the spectral analysis comprises an acquisition of a snapshot multispectral or hyperspectral image.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

In the Figures:

FIGS. 4A to 6B shows exemplary images and diagrams obtained by using an imaging device.

DETAILED DESCRIPTION OF THE EMBODIMENTS

Figure 1:
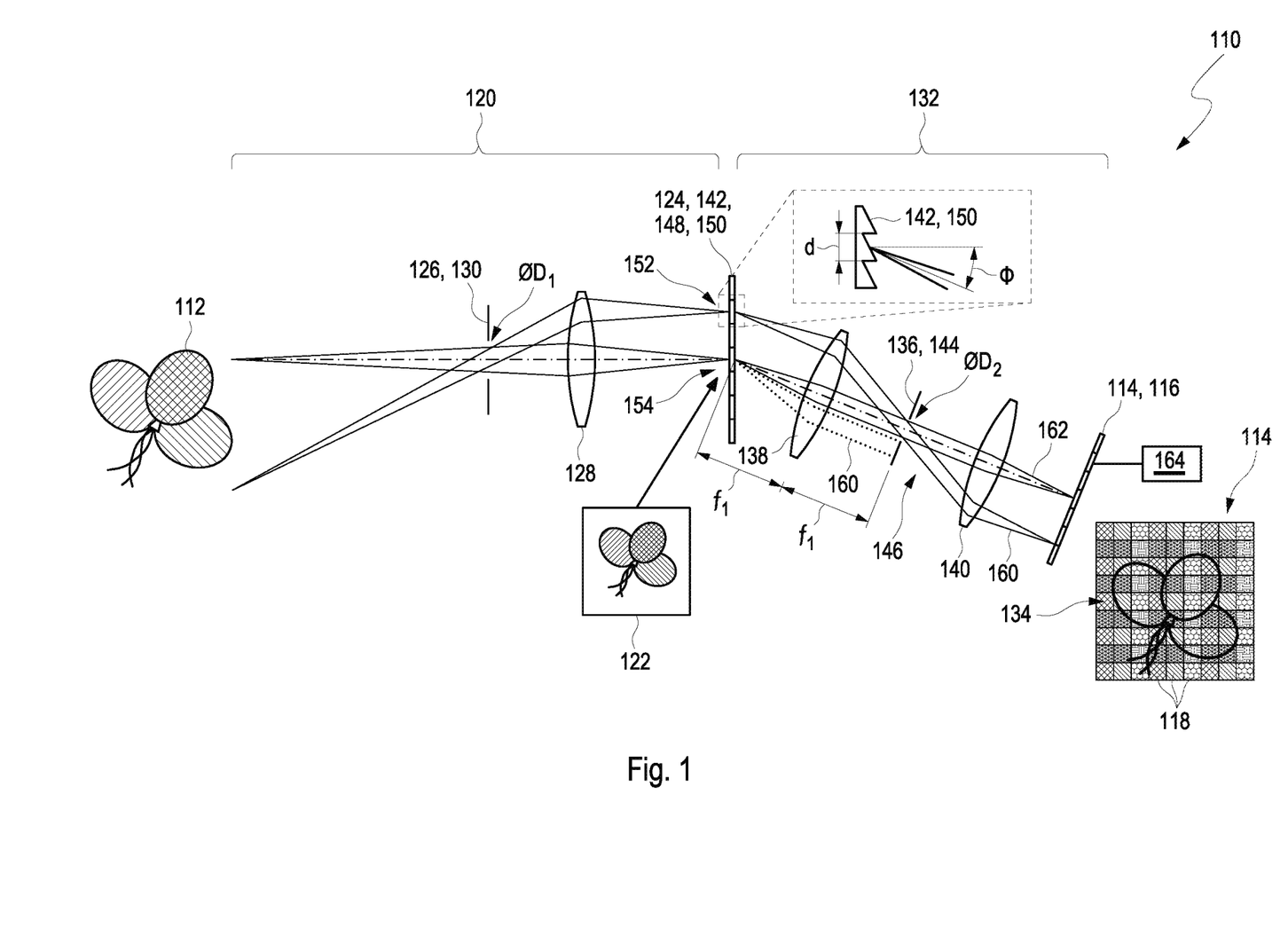
FIG. 1 shows an embodiment of an imaging device in a schematic view.

FIG. 1 shows an exemplary embodiment of an imaging device 110 for imaging at least one object 112 in a schematic view. Specifically, the imaging device 110 may be configured for multispectral imaging or hyperspectral imaging the object 112.

The imaging device 110 comprises at least one image sensor 114 located in at least one image plane 116 of the imaging device 110. The image sensor 114 comprises a plurality of photosensitive elements 118. Specifically, as schematically shown in FIG. 1, the image sensor 114 may comprise at least one monochrome image sensor having the plurality of photosensitive elements 118 arranged in a two-dimensional array.

The imaging device 110 further comprises at least one first imaging system 120 configured for generating at least one intermediate image 122 of the object 112 in at least one intermediate image plane 124. In the exemplary embodiment shown in FIG. 1, the first imaging system 120 may comprise at least one image-sided telecentric imaging system. The first imaging system 120 may comprise at least one first imaging aperture 126 and at least one first imaging lens 128. The first imaging lens 128 may specifically be a biconvex lens. The first imaging aperture 126 may be arranged in an object-sided focal plane 130 of the first imaging lens 128.

Further, the imaging device 110 comprises at least one second imaging system 132 configured for generating at least one image 134 of the intermediate image 122 on the image sensor 114 in the image plane 116. As shown in FIG. 1, the second imaging system 132 may comprise a double-sided telecentric imaging system. The second imaging system 132 may comprise at least one second imaging aperture 136 and at least two second imaging lenses 138, 140. The second imaging lenses 138, 140 may specifically be biconvex lenses. The second imaging aperture 136 may be arranged in between the two second imaging lenses 138, 140. The second imaging aperture 136 may specifically be arranged in an image-sided focal plane of the first of the two second imaging lenses 138. Additionally, the second imaging aperture 136 may be arranged in an object-sided focal plane of the second of the two second imaging lenses 140. Thus, in this example, the second imaging system 132 may be a double-sided imaging system. However, an object-sided imaging system may also be feasible.

The imaging device 110 further comprises at least one diffractive optical element 142 arranged in the intermediate image plane 124 and at least one aperture 144 arranged in a beam path 146 of the second imaging system 132 between the intermediate image plane 124 and the image sensor 114. In the exemplary embodiment of FIG. 1, the aperture 144 may be the second imaging aperture 136 of the second imaging system 132.

As can be seen in FIG. 1, the diffractive optical element 142 may comprise at least one transmissive diffractive optical element 148. However, in other embodiments, a reflective diffractive optical element may also be possible. Thus, in this example, the diffractive optical element 142 may comprise at least one grating 150, specifically a transmissive grating 152. The grating 150 may comprise at least two different grating regions 152, 154 having at least two different grating periods. The grating period is denoted in FIG. 1 by formula symbol d, as can be seen in the enhanced view of the diffractive optical element 142. The grating regions 152, 154 may specifically refer to regions of the diffractive optical element 142 having a constant periodic structure. The differing grating periods may differ by 5 nm up to 50 µm or by at least 5 nm up to 50 µm. In this example, the grating regions 152, 154 may be arranged in a checkerboard pattern. However, other examples are also feasible, such as exemplarily shown in FIG. 2.

Figure 2:
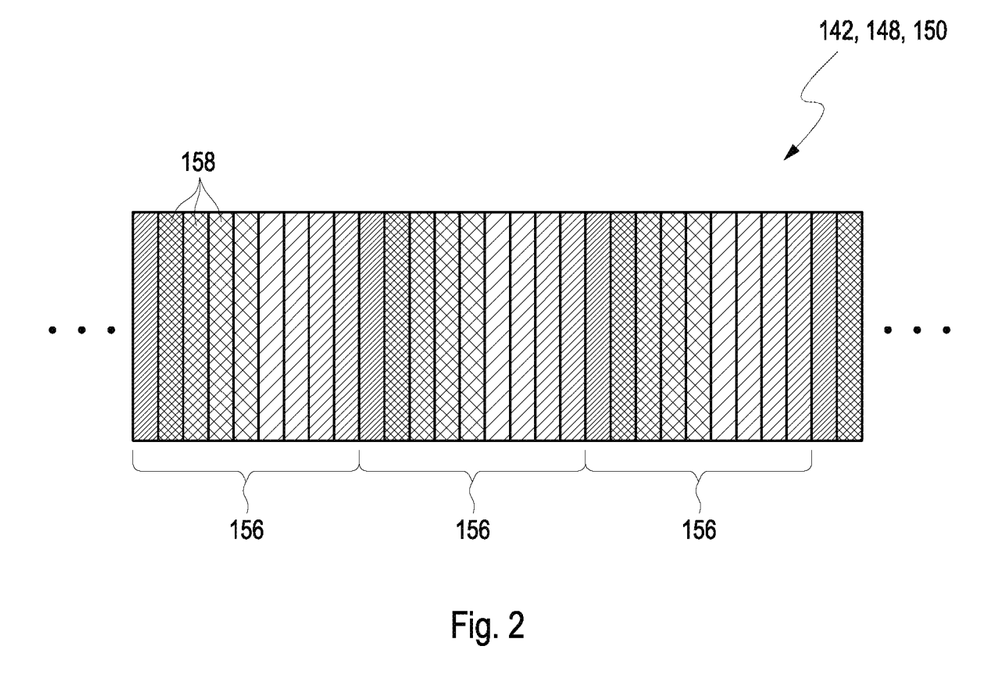
FIG. 2 shows a schematic embodiment of a diffractive optical element.

FIG. 2 shows an exemplary embodiment of the diffractive optical element 142. As can be seen in FIG. 2, the grating regions 152, 154 may be arranged in a stripe pattern. Further, the grating regions 152, 154 may comprise at least two differing groups of micro-regions 156 having differing grating periods, each group 156 comprising a plurality of micro-regions 158 having a constant grating period. In this example, each group 156 may comprise a number of nine micro-regions 156 having a constant grating period. The groups of micro-regions 156 may be arranged in a macro-pattern, specifically in a repeating macro-pattern.

The macro-pattern may specifically be an application-specific macro pattern. For example, the diffractive optical element 142 may be a lithographically fabricated diffractive optical element. For each application of the imaging device 110, a different macro-pattern of the diffractive optical element 142 may be used. Thus, the diffractive optical element 142 may be arranged interchangeably in the imaging device 110. Thus, for each specific application, a different diffractive optical element 142 may be used, wherein the diffractive optical element 142 may be easily changed in the imaging device 110 in between two applications.

Turning back to FIG. 1: The diffractive optical element 142, the second imaging system 132 and the aperture 142 are arranged such that at least two different images for at least two different wavelengths of the intermediate image 122 are generated on at least two different groups of the photosensitive elements 118.

The at least two different images may comprise at least one first image for at least one first wavelength (denoted by reference number 160) and at least one second image for at least one second wavelength (denoted by reference number 162). Specifically, the first image may be an image obtained by image sensor's 114 readings from a first group of photosensitive elements 118 of the at least two different groups of the photosensitive elements 118, wherein the second image may be an image obtained by the image sensor's 114 readings from a second group of photosensitive elements 118 of the at least two different groups of the photosensitive elements 118. The diffractive optical element 142, the second imaging system 132 and the aperture 144 may be arranged such that the first wavelength 160 being diffracted at the first grating region 152 of the diffractive optical element may pass the aperture 136, wherein the second wavelength 162 being diffracted at the first grating region 152 of the diffractive optical element 142 may be blocked by the aperture 144. Additionally, the diffractive optical element 142, the second imaging system 132 and the aperture 144 may be arranged such that the first wavelength 160 being diffracted at the second grating region 154 of the diffractive optical element 142 may be blocked by the aperture 144, wherein the second wavelength 162 being diffracted at the second grating region 154 of the diffractive optical element 142 may pass the aperture 144.

Further, the imaging device 110 may comprise at least one evaluation unit 164. The evaluation unit 164 may be configured for performing a spectral analysis of the object 112 by evaluating signals of the different groups of photosensitive elements 118. The spectral analysis may comprise an acquisition of a snapshot multispectral or hyperspectral image.

Figure 3:
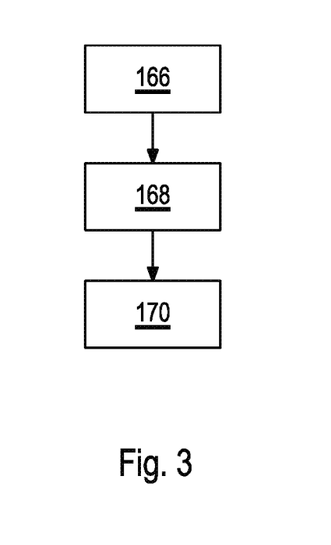
FIG. 3 shows a flow chart of an embodiment of a method for imaging at least one object.

FIG. 3 shows a flow chart of an exemplary embodiment of a method for imaging the at least one object 112, specifically for multispectral imaging or hyperspectral imaging. The method comprises the following steps, which, as an example, may be performed in the given order. It shall be noted, however, that a different order is also possible. Further, it is possible to perform one or more of the method steps once or repeatedly. Further, it is possible to perform two or more of the method steps simultaneously or in a timely overlapping fashion. The method may comprise further method steps which are not listed.

The Method Comprises:
i. (denoted by reference number 166) generating the at least one intermediate image 122 of the object 112 in the at least one intermediate image plane 124 by using the at least one first imaging system 120; and
ii. (denoted by reference number 168) generating the at least one image 134 of the intermediate image 122 on the at least one image sensor 114 located in the at least one image plane 116 by using the at least one second imaging system 132, wherein the image sensor 114 comprises the plurality of photosensitive elements 118, wherein step ii. comprises using the at least one diffractive optical element 142 arranged in the intermediate image plane 124 and the at least one aperture 114 arranged in the beam path 146 of the second imaging system 132 between the intermediate image plane 124 and the image sensor 114, wherein the diffractive optical element 142, the second imaging system 132 and the aperture 144 are arranged such that at least two different images for at least two different wavelengths of the intermediate image 122 are generated on at least two different groups of the photosensitive elements 118.

The method may specifically comprise using the at least one imaging device 110 according to the present invention, such as according to the embodiment shown in FIG. 1 and/or according to any one of the embodiments disclosed in further detail above. Thus, for a description of the imaging device 110, reference may be made to the description of FIG. 1.

As can be seen in FIG. 3, the method may further comprise performing a spectral analysis of the object 112 by evaluating signals of the different groups of photosensitive elements 118 (denoted by reference number 170). Specifically, the spectral analysis may comprise an acquisition of a snapshot multispectral or hyperspectral image.

Figure 4:
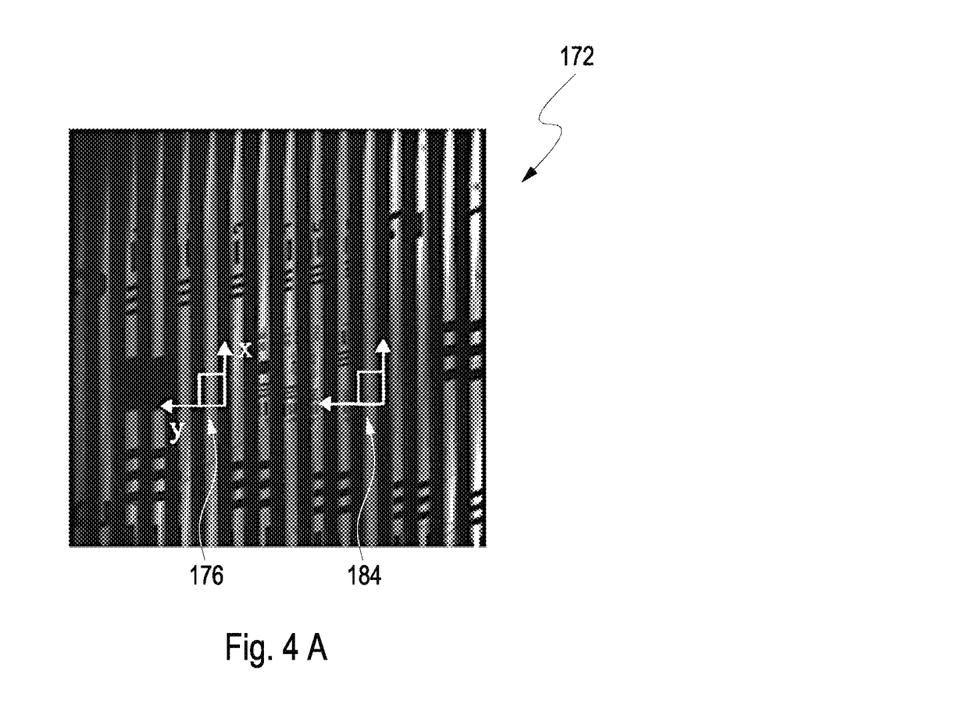

FIG. 4A shows an exemplary image obtained by using the imaging device 110. The imaging device 110 may specifically be embodied as shown in FIG. 1 having the diffractive optical element 142 shown in FIG. 2. In this example, the imaging device 110 may have nine spectral channels designed for a wavelength range between 510 nm and 700 nm. The diffractive optical element, as shown in FIG. 2, may consist of a repeating stripe pattern. A plurality of nine micro-regions 158 may be combined to a group of micro-regions 156. An optical simulation was performed using Zemax®. A numerical aperture may be set to 0.005. For the simulation, a grating with a constant frequency of 0,425 lines/μm may be used, leading to an diffraction angle of 14.79° for a wavelength of 600 nm. For the second imaging system 132, an achromatic lens with a focal length of 200 mm (Thorlabs® AC254-200-A) may be used, leading to a beam diameter of 2.00 mm which defines the size of the aperture 144 $D_2$. The second lens of the second imaging lenses 140 may be a 100 mm achromatic lens (Thorlabs® AC254-100-A) and may be used to focus the light onto the image sensor 114. Based on the simulation, a spectral resolution of ≈21 nm full-width half-maximum for the imaging device 110 may be expected.

With the Rayleigh criterion $$\Delta X = 0.61 \frac{\lambda}{NA},$$

a spatial resolution in the intermediate image plane 124 may be 73.2 μm for λ=600 nm.

A width of the micro-regions 158 may be to 70 μm, which is close to the spatial resolution limit for the central wavelength. A size of the diffractive optical element 142 of 10 mm×10 mm leads to a number of 142 micro-regions 158 and a number of 15 groups of micro-regions, respectively. For the image sensor 114, a monochrome image sensor (Ximea® MQ013MG-E2) with an active area of 6.9 mm×5.5 mm and a pixel size of 5.3 μm may be used. The first imaging system 120 for generating the intermediate image 122 may comprise a 40 mm and a 100 mm lens. The first imaging aperture 126 may be placed in the object-sided focal plane of the second of the first imaging lenses 128 to generate an image-sided telecentric imaging system. A diameter of the first imaging aperture 126 $D_1$ may be adjusted to fit the targeted NA of the imaging device 110, specifically such that the aperture 144 fits to the beam diameter.

In order to characterize the imaging device 110, a USAF target (Thorlabs® R1DS1P) may be illuminated by a fiber coupled broadband halogen lamp in combination with different bandpass filters. The measurements may consist of fifty averaged individual measurements to reduce noise. FIG. 4A shows an exemplary image with spectrally filtered illumination 172 obtained by using the imaging device 110. The bandpass filter may have a central wavelength of 620 nm and a bandwidth of 10 nm. An illumination spectrum 174 was measured by a spectrometer and can be seen in the diagram of FIG. 4B. The diagram of FIG. 4B shows the signal intensity 178 on the y-axis in arbitrary units dependent on the wavelength 182 in nanometers on the x-axis of the diagram. As can be seen in FIG. 4A, only those areas appear bright, where the micro-regions 150 match the wavelength of the illumination.

Figure 5A:
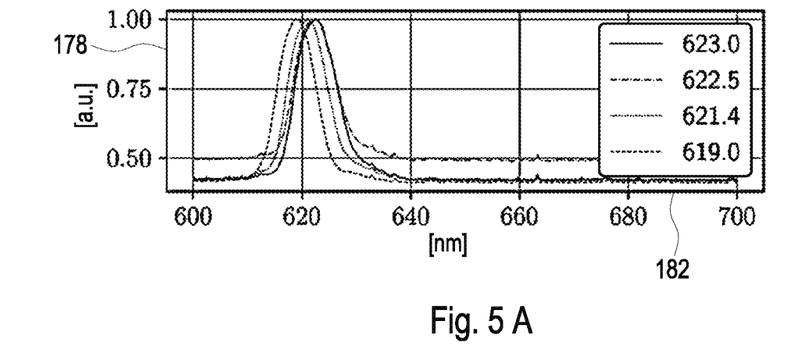
Figure 5B:
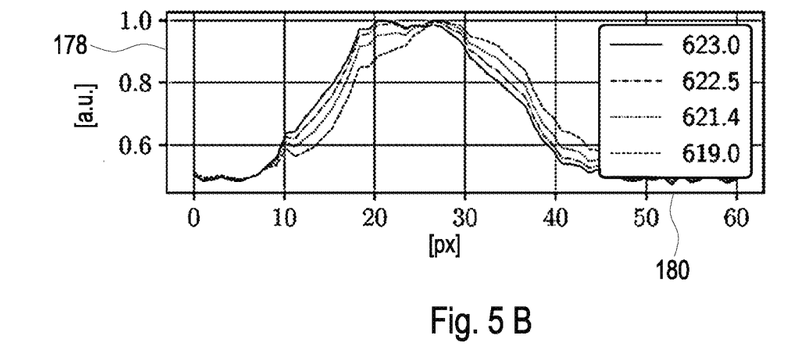
Figure 5C:
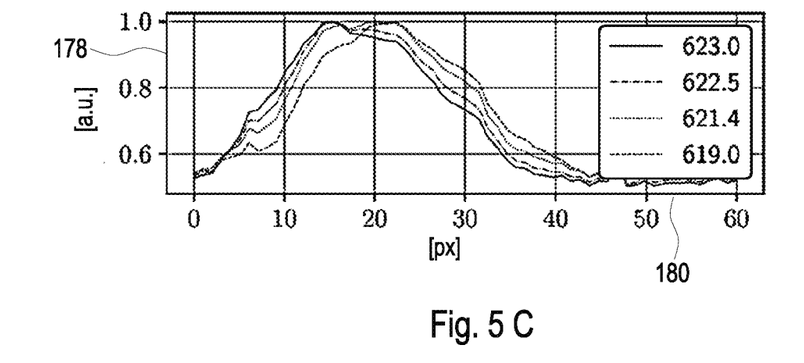

For evaluating of a wavelength sensitivity of the imaging device 110, the bandpass filter was successively tilted, such that the center of mass (COM) of the spectrum changed from 623.0 nm to 622.5 nm, 621.4 nm and 619.0 nm. The shift of the spectrum was observed with a spectrometer. The illumination spectra obtained by using the spectrometer are shown in FIG. 5A. Specifically, in FIG. 5A, the signal intensity 178 obtained by using the spectrometer is shown in arbitrary units as a function of the wavelength 182. FIGS. 5B and 5C show the signals 178 in arbitrary units along the horizontal spatial coordinate 180 of the marked areas 176 and 184 shown in the image 172 of FIG. 4A. As can be seen in FIGS. 5B and 5C, the peak location changes for the different wavelengths.

Figure 6:
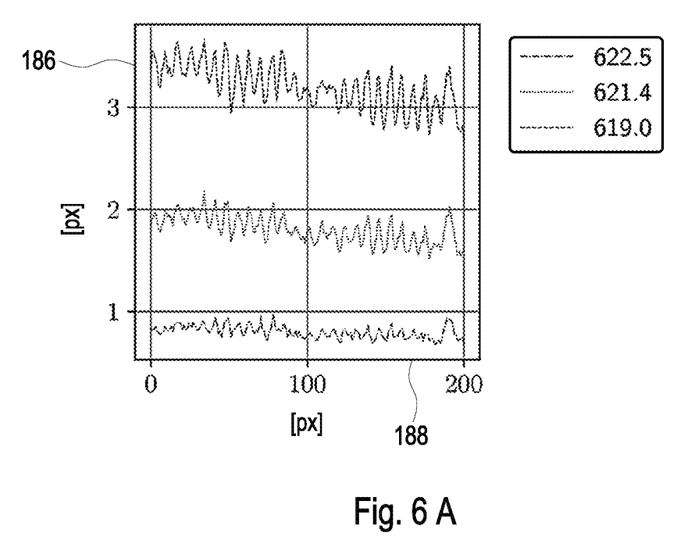

FIGS. 6A and 6B show the change of the COM 186 for the different illumination spectra with respect to the spectrum with a COM of 623.0 nm as a function of the vertical spatial coordinate 188 of the area 176 (FIG. 6A) and the area 184 (FIG. 6B) shown in FIG. 4A. Each area may consist of 200 columns along the vertical spatial coordinate 188, denoted in FIG. 4A as x-axis. A threshold for the values considered for the calculation of the COM of 50% of the maximum of each evaluated column may be used. As can be seen in FIGS. 6A and 6B, the amount of displacement in both the area 178 and the area 184 may be overlaid by a periodic structure. The amplitude of this structure may increase with stronger COM displacement. Additionally, a different trend may be observed in the two plots. This may be originate in possible aberrations of the imaging device 110 or by the diffractive optical element 142 itself. Both the periodic pattern and the different trend may be easily corrected by calibration. Table 1 shows the average change of the COM as well as the standard deviation for the change inside the area 178 and the area 184.

TABLE 1

Average change of the COM for the area 178 and the area 184

| Wavelength [nm] | Area 178 | | Area 184 | |
|---|---|---|---|---|
| | Average [px] | Standard deviation [px] | Average [px] | Standard deviation [px] |
| 623.0-622.5 | 0.80 | 0.06 | 0.89 | 0.10 |
| 623.0-621.4 | 1.80 | 0.14 | 2.03 | 0.19 |
| 623.0-616.0 | 3.20 | 0.22 | 3.56 | 0.28 |

Thus, the imaging device 110 may provide a new approach for hyperspectral snapshot imaging using the diffractive optical element 142 arranged in the intermediate image plane 124. An individually manufactured diffractive optical element 142 in combination with the aperture 144 may perform a spectral filtering. Compared to known device and systems, the imaging device 110 may be simpler and provide a more stable filter response. Moreover, it may be possible to choose arbitrary spatio-spectral patterns for a given application. These advantages may be achieved at the cost of a coupling of spatial and spectral resolution along the direction of the spectral separation. However, it should be mentioned that the spectral resolution may not always be the relevant parameter. For some applications, e.g. chromatic confocal microscopy, the exact determination of the center of gravity of a broad spectral distribution may be the relevant specification. For such applications, the imaging device 110 as described with respect to FIGS. 4A to 6B, may provide a sensitivity with regard to spectral shifts as small as 0.5 nm covering a wavelength range from 510 to 700 nm with nine channels. Analog to typical Bayer-like image sensors, some of the spatial resolution might be restored using demosaicing algorithms as it is common in RGB image sensors.

LIST OF REFERENCE NUMBERS 110 imaging device
112 object
114 image sensor
116 image plane
118 photosensitive element
120 first imaging system
122 intermediate image
124 intermediate image plane
126 first imaging aperture
128 first imaging lens
130 object-sided focal plane of the first imaging lens
132 second imaging system
134 image
136 second imaging aperture
138 first lens of the second imaging lenses
140 second lens of the second imaging lenses
142 diffractive optical element
144 aperture
146 beam path
148 transmissive diffractive optical element
150 grating
152 first grating region
154 second grating region
156 group of micro-regions
158 micro-region
160 first wavelength
162 second wavelength
164 evaluation unit
166 generating an intermediate image
168 generating an image
170 performing a spectral analysis
172 image with spectrally filtered illumination
174 illumination spectrum
176 marked area
178 signal intensity
180 horizontal spatial coordinate
182 wavelength
184 marked area
186 change of the COM
188 vertical spatial coordinate

The invention claimed is:
1. An imaging device for imaging at least one object comprising

I. at least one image sensor located in at least one image plane of the imaging device, the image sensor comprising a plurality of photosensitive elements;
II. at least one first imaging system configured for generating at least one intermediate image of the object in at least one intermediate image plane;
III. at least one second imaging system configured for generating at least one image of the intermediate image on the image sensor in the image plane;
IV. at least one diffractive optical element arranged in the intermediate image plane; and
V. at least one aperture arranged in a beam path of the second imaging system between the intermediate image plane and the image sensor,
wherein the diffractive optical element, the second imaging system and the aperture are arranged to generate at least two different images for at least two different wavelengths of the intermediate image are generated simultaneously on at least two different groups of the photosensitive elements.

2. The imaging device according to claim 1, wherein the diffractive optical element comprises at least one of a transmissive and a reflective diffractive optical element.

3. The imaging device according to claim 1, wherein the diffractive optical element comprises at least one grating being selected from the group of a transmissive and a reflective grating.

4. The imaging device according to claim 3, wherein the grating comprises at least two different grating regions having at least two different grating periods.

5. The imaging device according to claim 4, wherein the grating regions are arranged in a stripe pattern.

6. The imaging device according to claim 4, wherein the grating regions comprise at least two differing groups of micro-regions having differing grating periods, each group comprising a plurality of micro-regions having a constant grating period, wherein the groups of micro-regions are arranged in a macro-pattern.

7. The imaging device according to claim 4, wherein the at least two different grating regions are configured to diffract the at least two different wavelengths at the same time.

8. The imaging device according to claim 1, wherein the diffractive optical element is arranged interchangeably in the imaging device.

9. The imaging device according to claim 1, wherein the at least two different images comprise at least one first image for at least one first wavelength and at least one second image for at least one second wavelength, wherein the diffractive optical element, the second imaging system and the aperture are arranged such that the first wavelength being diffracted at a first grating region of the diffractive optical element passes the aperture, wherein the second wavelength being diffracted at the first grating region of the diffractive optical element is blocked by the aperture.

10. The imaging device according to claim 9, wherein the diffractive optical element, the second imaging system and the aperture are arranged such that the first wavelength being diffracted at a second grating region of the diffractive optical element is blocked by the aperture, wherein the second wavelength being diffracted at the second grating region of the diffractive optical element passes the aperture.

11. The imaging device according to claim 1, wherein the first imaging system comprises at least one first imaging aperture and at least one first imaging lens.

12. The imaging device according to claim 1, wherein the first imaging system comprises at least one image-sided telecentric imaging system, wherein the first imaging aperture is arranged in an object-sided focal plane of the first imaging lens.

13. The imaging device according to claim 1, wherein the second imaging system comprises at least one of a double-sided telecentric imaging system, an object-sided telecentric imaging system and a non-telecentric imaging system.

14. The imaging device according to claim 1, wherein the second imaging system comprises at least one second imaging aperture and at least two second imaging lenses, wherein the second imaging aperture is arranged in between the two second imaging lenses, wherein the second imaging aperture is arranged in an image-sided focal plane of the first of the two second imaging lenses, wherein the second imaging aperture is arranged in an object-sided focal plane of the second of the two second imaging lenses.

15. The imaging device according to claim 1, further comprising at least one evaluation unit, wherein the evaluation unit is configured for performing a spectral analysis of the object by evaluating signals of the different groups of photosensitive elements, wherein the spectral analysis comprises an acquisition of a snapshot multispectral or hyperspectral image.

16. A method for imaging at least one object, the method comprising:
i. generating at least one intermediate image of the object in at least one intermediate image plane by using at least one first imaging system; and
ii. generating at least one image of the intermediate image on at least one image sensor located in at least one image plane by using at least one second imaging system, wherein the image sensor comprises a plurality of photosensitive elements,
wherein step ii. comprises using at least one diffractive optical element arranged in the intermediate image plane and at least one aperture arranged in a beam path of the second imaging system between the intermediate image plane and the image sensor, wherein the diffractive optical element, the second imaging system and the aperture are arranged such that at least two different images for at least two different wavelengths of the intermediate image are generated at the same time on at least two different groups of the photosensitive elements.

* * * * *